(12) United States Patent
Krieger et al.

(10) Patent No.: US 10,700,887 B2
(45) Date of Patent: Jun. 30, 2020

(54) ETHERNET BUS, CONTROLLER AND METHOD FOR WAKING A CONTROLLER OF AN ETHERNET BUS

(71) Applicant: VOLKSWAGEN AKTIENGESELLSCHAFT, Wolfsburg (DE)

(72) Inventors: Olaf Krieger, Lostau (DE); Lothar Claus, Königslutter (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 221 days.

(21) Appl. No.: 15/746,948

(22) PCT Filed: Oct. 21, 2016

(86) PCT No.: PCT/EP2016/075380
§ 371 (c)(1),
(2) Date: Jan. 23, 2018

(87) PCT Pub. No.: WO2017/080792
PCT Pub. Date: May 18, 2017

(65) Prior Publication Data
US 2018/0241583 A1 Aug. 23, 2018

(30) Foreign Application Priority Data
Nov. 10, 2015 (DE) .......... 10 2015 222 112

(51) Int. Cl.
*H04L 12/40* (2006.01)
*H04L 12/12* (2006.01)
(Continued)

(52) U.S. Cl.
CPC ...... *H04L 12/40039* (2013.01); *G06F 1/3296* (2013.01); *G06F 13/4068* (2013.01);
(Continued)

(58) Field of Classification Search
CPC ... G06F 13/4068; G06F 1/3296; Y02D 50/40; Y02D 50/42; H04L 12/40013; H04L 12/40039; H04L 2012/40273
See application file for complete search history.

(56) References Cited

U.S. PATENT DOCUMENTS 5,892,893 A * 4/1999 Hanf ............... G06F 1/3209
714/3
8,862,921 B1 10/2014 Kim et al.
(Continued)

FOREIGN PATENT DOCUMENTS

CN 101977162 A 2/2011
CN 204659637 U 9/2015
(Continued)

OTHER PUBLICATIONS

Search Report for German Patent Application No. 10 2015 222 112.1, dated Jul. 6, 2016.
(Continued)

*Primary Examiner* — Phil K Nguyen
*Assistant Examiner* — Brian J Corcoran
(74) *Attorney, Agent, or Firm* — Barnes & Thornburg LLP

(57) ABSTRACT

An Ethernet bus having at least two controllers, wherein the controllers each have a bus driver and a microprocessor, wherein at least the first controller has a voltage regulator that adjusts at least two voltage values for the operating voltage of the controller, wherein a first voltage value is provided for a sleep-operating state and the second voltage value is provided for a communication-operating state, wherein the bus drivers are each connected via at least two bus lines, each having a termination network connected to them, wherein the termination network has at least two resistors and a capacitor, wherein the two resistors are provided with one bus line each and are connected to one
(Continued)

another at a center tap of the termination network, wherein the capacitor of the termination network is arranged between center tap and earth. Also disclosed is a method for waking a controller.

8 Claims, 1 Drawing Sheet

(51) Int. Cl.
G06F 1/3296 (2019.01)
G06F 13/40 (2006.01)

(52) U.S. Cl.
CPC ........ *H04L 12/12* (2013.01); *H04L 12/40013* (2013.01); *H04L 2012/40273* (2013.01); *Y02D 50/40* (2018.01); *Y02D 50/42* (2018.01)

(56) References Cited

U.S. PATENT DOCUMENTS

| | | | | |
|---|---|---|---|---|
| 2004/0119517 A1* | 6/2004 | Pauletti | ............ | H04L 12/40032 327/198 |
| 2004/0145500 A1* | 7/2004 | Huebl | ............... | H04L 12/40039 340/994 |
| 2009/0077394 A1 | 3/2009 | Tsai et al. | | |
| 2010/0017661 A1* | 1/2010 | Queck | ............... | H04L 12/40006 714/43 |
| 2011/0080269 A1* | 4/2011 | Wagner | ............ | H04L 12/40032 340/10.33 |
| 2012/0216084 A1 | 8/2012 | Chun et al. | | |
| 2012/0272340 A1 | 10/2012 | Eldar | | |
| 2015/0200789 A1* | 7/2015 | Jiang | ................. | H04L 12/40006 370/463 |

FOREIGN PATENT DOCUMENTS

| | | |
|---|---|---|
| DE | 102010049835 A1 | 5/2012 |
| DE | 102013004737 A1 | 10/2013 |
| DE | 102013208004 B3 | 7/2014 |
| EP | 2339790 A1 | 6/2011 |
| EP | 2381323 A1 | 10/2011 |
| KR | 20120030341 A | 3/2012 |

OTHER PUBLICATIONS

Search Report for International Patent Application No. PCT/EP2016/075380, dated Jan. 19, 2017.
Office Action for Korean Patent Application No. 10-2018-7004387; dated Jun. 27, 2018.
Office Action for Chinese Patent Application No. 201680065665.8; Apr. 7, 2020.

* cited by examiner

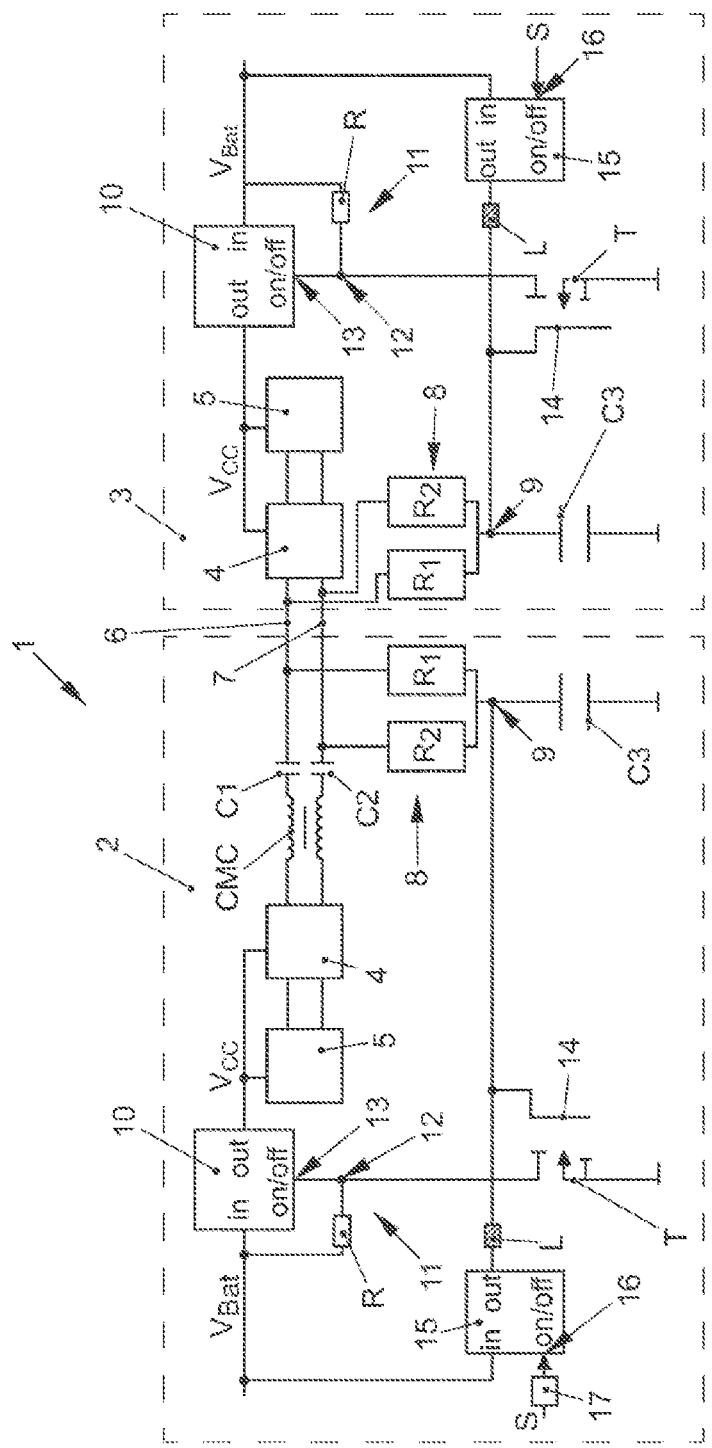

ETHERNET BUS, CONTROLLER AND METHOD FOR WAKING A CONTROLLER OF AN ETHERNET BUS

PRIORITY CLAIM

This patent application is a U.S. National Phase of International Patent Application No. PCT/EP2016/075380, filed 21 Oct. 2016, which claims priority to German Patent Application No. 10 2015 222 112.1, filed 10 Nov. 2015, the disclosures of which are incorporated herein by reference in their entireties.

SUMMARY

Illustrative embodiments relate to an Ethernet bus, to a controller and to a method for waking up a controller of an Ethernet bus.

BRIEF DESCRIPTION OF THE DRAWINGS

The disclosed embodiments are explained in greater detail below with reference to the drawing FIG. 1 is a schematic block diagram of part of an Ethernet bus.

DETAILED DESCRIPTION

Controllers in a bus system, in particular in a vehicle network, are meant to be active only when their function is needed. They are otherwise meant to be inactive and to have negligible energy consumption. Special wakeup-compatible bus drivers, which switch on a voltage regulator of a controller when there is a valid signal on the bus, are specified for CAN and FlexRay network technologies. Such a standard does not yet exist for Ethernet bus systems.

It has already been proposed in this context to apply a wakeup signal as a differential signal to both data lines or bus lines. This may be an AC voltage signal that resembles the regular communication signal or may be a DC voltage. The circuits for applying and for detecting the wakeup signal can adversely affect the symmetry and hence the transmission characteristics.

The disclosure addresses the technical problem of creating an Ethernet bus and a controller that can be used to wake up a controller without affecting the symmetry, and to provide a method for waking up a controller of an Ethernet bus.

Disclosed embodiments provide an Ethernet bus, a controller, and a method.

The Ethernet bus comprises at least two controllers. A controller may also be a switch in this context. Each of the controllers comprises a bus driver and a microprocessor, wherein at least a first controller comprises a voltage regulator which can set at least two voltage values for the operating voltage of the controller. In this case, a first voltage value is provided for a "sleep" or inactive operating state, and the second voltage value for a "communication" or "awake" or active operating state. The bus drivers are each connected to one another via at least two bus lines. A termination network is connected to the bus lines in each case, and forms part of the particular controller. The termination network comprises at least two resistors and a capacitor, wherein the two resistors are connected one to each bus line, and are connected to one another at a center tap of the termination network, wherein the capacitor of the termination network is arranged between center tap and ground. The Ethernet bus comprises at least one wakeup module, which is designed to produce a voltage signal on the basis of a wakeup event to change the voltage at the center tap of the controller containing the voltage regulator. Assigned to the at least one voltage regulator is a circuit, by which the voltage regulator is controlled according to the voltage at the center tap to change from the first voltage value to the second voltage value and is thereby woken up or activated. The symmetry of the data transmission is unaffected in the process. It can be provided here that the voltage must be present only for a predetermined time at the output of the wakeup module and can then be switched off again, with the voltage regulator remaining set at the second voltage value, or else that the voltage appears continuously at the output of the wakeup module for as long as the controller is meant to remain active.

In at least one disclosed embodiment, the second controller also comprises a voltage regulator having two voltage values, to which voltage regulator is assigned a circuit to evaluate the voltage at the center tap for the voltage regulator. Hence also the second controller can be deactivated, with the wakeup of the first controller causing the second controller to wake up automatically as well, because a change in the voltage at the center tap of the first controller results via the bus lines also in a change in the voltage at the center tap of the other controller.

In another disclosed embodiment, the second controller also comprises a wakeup module.

In another disclosed embodiment, the wakeup module and/or the circuit is integrated in the controller.

In another disclosed embodiment, the circuit comprises a resistor and a transistor, which form a voltage divider, wherein a control input of the voltage regulator is connected to a center tap of the voltage divider, wherein the voltage divider lies between an operating voltage and ground, wherein a control input of the transistor is connected to the center tap of the termination network. The wakeup module is thereby able to switch the transistor into conduction, which results in a change in the voltage at the center tap of the voltage divider and hence in switching of the voltage regulator. It should be mentioned here that an inverted logic is also possible, for instance, the voltage from the wakeup module switches off the transistor. In this disclosed embodiment, the operating voltage at the circuit need not be the same as the operating voltage of the controller.

In another disclosed embodiment, at least one filter is assigned to the wakeup module to suppress high-frequency common-mode interference. For example, a choke or a low-pass filter is arranged at the output of the wakeup module for this purpose. This prevents the controller from being woken up unintentionally by this common-mode interference. A low-pass filter can also be arranged at the input to the wakeup module to suppress input interference.

An area of use is in a motor vehicle.

FIG. 1 shows an Ethernet bus 1 comprising a first controller 2 and a second controller 3. The controllers 2, 3 each comprise a bus driver 4 and a microprocessor 5, with the bus drivers 4 being connected to one another by at least two bus lines 6, 7. The two controllers 2, 3 each comprise a termination network 8 consisting of two resistors R1, R2 and a capacitor C3. In each case, the resistor R1 is connected to the bus line 6, and the resistor R2 to the bus line 7, with the two resistors connected to each other at a center tap 9 of the termination network 8. The capacitor C3 is arranged between the center tap 9 and ground. In addition, the two controllers 2, 3 comprise coupling capacitors C1, C2, which are connected to the bus lines 6, 7 and lie between bus line 6, 7 and bus driver. The coupling capacitors C1, C2 of the second controller 3 are not shown in the FIGURE. The controllers 2, 3 also comprise a common-mode choke CMC, although again the FIGURE does not show the choke of the second controller 3. The controllers 2, 3 each comprise a voltage regulator 10, which converts a first operating voltage VBAT into an operating voltage VCC for the controller 2, 3. The operating voltage VCC can be off (first voltage value) or on (second voltage value). Assigned to the voltage regulator 10 is a circuit 11 comprising a resistor R and a transistor T, which lie in series between the operating voltage VBAT and ground. The circuit 11 forms a voltage divider, in which the center tap 12 is connected to a control input 13 of the voltage regulator 10. A control input 14 of the transistor T is connected to the center tap 9 of the termination network 8. In addition, each of the controllers 2, 3 comprises a wakeup module 15, which converts the operating voltage VBAT to an output voltage, which is applied to the center tap 9 via a choke L. In this case, the receiving module 15 comprises a control input 16, which switches through the output voltage on the basis of a wakeup event S, wherein again a low-pass filter 17 can be arranged before the control input 16.

In the inactive state, the transistor T is in the off state, with the result that approximately VBAT appears at the control input 13 of the voltage regulator 10. If the controller 2 is now meant to be woken up, then a signal S is applied to the control input 16, whereby the output voltage of the wakeup module 15 appears at the center tap 9 and raises its potential. The control input 14 thereby drives the transistor T on. As a result, the operating voltage VBAT is dropped across the resistor R, and the control input 13 is pulled to ground. This causes the operating voltage VCC to be switched through for the microprocessor 5 and bus driver 4 (second voltage value). The rise in potential at the center tap 9 of the controller 2 is transferred via the bus lines 6, 7 to the center tap 9 of the second controller 3, with the result that switching on is performed there in a similar way to the voltage regulator 10.

The invention claimed is:

1. An Ethernet bus comprising:
    at least two controllers, wherein each of the at least two controllers comprises a bus driver and a microprocessor, wherein at least a first controller of the at least two controllers further comprises a voltage regulator which sets at least two voltage values for the operating voltage of the first controller, wherein a first voltage value of the at least two voltage values is provided for a sleep operating state, and a second voltage value of the at least two voltage values is provided for a communication operating state, wherein the bus drivers are each connected to one another via at least two bus lines, wherein a termination network is connected to each of the bus lines, wherein the termination network comprises at least two resistors and a capacitor, wherein each of the two resistors is provided with a bus line and are connected to one another at a center tap of the termination network, wherein the capacitor of the termination network is arranged between center tap and ground;
    at least one wakeup module which produces a voltage signal based on a wakeup event to change the voltage at the center tap of the first controller containing the voltage regulator; and
    a circuit assigned to the at least one voltage regulator, by which the voltage regulator is controlled according to the voltage at the center tap to change from the first voltage value to the second voltage value.

2. The Ethernet bus of claim 1, wherein the second controller also comprises a voltage regulator having two voltage values, and a circuit is assigned to evaluate the voltage at the center tap for the second voltage regulator.

3. The Ethernet bus of claim 1, wherein the first and second controllers are each assigned a wakeup module.

4. The Ethernet bus of claim 1, wherein the wakeup module is integrated in each of first and second controllers.

5. The Ethernet bus of claim 1, wherein the circuit comprises a resistor and a transistor, which form a voltage divider, wherein a control input of the voltage regulator is connected to a center tap of the voltage divider, wherein the voltage divider lies between an operating voltage and ground, wherein a control input of the transistor is connected to the center tap of the termination network.

6. The Ethernet bus of claim 1, further comprising at least one filter assigned to the wakeup module to suppress high-frequency common-mode interference.

7. A controller for an Ethernet bus; the controller comprising a bus driver, a microprocessor and a voltage regulator, wherein the voltage regulator has at least two voltage values for the operating voltage of the controller, wherein a first voltage value is provided for a sleep operating state, and the second voltage value for a communication operating state, wherein the controller comprises a termination network which comprises at least two resistors and a capacitor, wherein one resistor is connected to each bus line, and the two resistors are connected to one another at a center tap, wherein the capacitor is arranged between the center tap and ground,
    wherein the controller comprises a wakeup module, which comprises an input for a wakeup event and an output for the center tap of the termination network.

8. A method for waking up a controller of an Ethernet bus, wherein the controller comprises a bus driver, a microprocessor and a voltage regulator which sets at least two voltage values for the operating voltage of the controller, wherein a first voltage value is provided for a sleep operating state, and the second voltage value for a communication operating state, wherein the bus driver is connected to at least two bus lines, wherein a termination network is connected to the bus lines which comprises at least two resistors and a capacitor, wherein the two resistors are connected one to each bus line, and are connected to one another at a center tap of the termination network, wherein the capacitor of the termination network is arranged between center tap and ground,
    wherein a wakeup module is provided, which produces a voltage signal based on a wakeup event to change the voltage at the center tap, the method comprising a circuit detecting this voltage change at the center tap and controlling the voltage regulator to change from the first voltage value to the second voltage value.

* * * * *